US008099045B2

(12) United States Patent
Chang

(10) Patent No.: US 8,099,045 B2
(45) Date of Patent: Jan. 17, 2012

(54) NEAR FIELD COMMUNICATION SYSTEM AND ASSOCIATED APPARATUS

(75) Inventor: Wei Chang, Hsinchu (TW)

(73) Assignee: MStar Semiconductor Inc. (TW)

( * ) Notice: Subject to any disclaimer, the term of this patent is extended or adjusted under 35 U.S.C. 154(b) by 514 days.

(21) Appl. No.: 12/315,013

(22) Filed: Nov. 26, 2008

(65) Prior Publication Data

US 2009/0137204 A1    May 28, 2009

(30) Foreign Application Priority Data

Nov. 26, 2007  (TW) .................................. 096144868

(51) Int. Cl.
*H04B 5/00* (2006.01)
*H04M 1/00* (2006.01)

(52) U.S. Cl. ..................................... 455/41.1; 455/556.1

(58) Field of Classification Search ........... 343/700 MS, 343/702; 455/41.1, 41.2, 556.1
See application file for complete search history.

(56) References Cited

U.S. PATENT DOCUMENTS

| 6,751,476 | B2 * | 6/2004 | Masaki et al. ................. 455/558 |
| 2007/0103377 | A1 * | 5/2007 | Abramov et al. ............. 343/818 |
| 2009/0203399 | A1 * | 8/2009 | Rofougaran ............... 455/556.1 |

* cited by examiner

*Primary Examiner* — Steven J Mottola

(57) ABSTRACT

A near field communication (NFC) system and an associated apparatus are provided. The NFC system includes a display device, a host computer, at least one RF module coupled to the host computer, a plurality of antennas coupled to the at least one RF module, and a NFC device. The antennas are disposed behind the display device. The NFC device is for communicating with the host computer via one of the antennas. The NFC system can upgrade communication quality and achieve multi-tasking efficiency.

15 Claims, 6 Drawing Sheets

NEAR FIELD COMMUNICATION SYSTEM AND ASSOCIATED APPARATUS

BACKGROUND OF INVENTION

1. Field of the Invention

The present invention relates to near field communication (NFC), and more particularly to a NFC system having a plurality of antennas and an associated apparatus.

2. Description of the Prior Art

Near field communication (NFC) technology is designed for short distance wireless communication and now is widely applied to our daily life. For example, the contact-less radio frequency identification (RFID) card has been applied to the public transportation tickets and the credit card transactions. The NFC technology performs data transmission through inductive coupling. Take a passive (i.e. powerless in itself) RFID card or RFID tag as example: there are coil antennas inside the RFID card and the card reader; the card reader generates an alternating magnetic field by its coil antenna, and the coil antenna of the RFID card inductively couples the alternating magnetic field to generate the electric power required for operation of the circuit within the RFID card. The communication between the RFID card and the card reader is performed by using carriers of high frequency (HF, such as 13.56 MHz) or low frequency (LF, such as 125 KHz) in the spectrum. The RFID card can backscatter its data to the card reader. The card reader can transmits data to the RFID card so as to write the data into the RFID card. In addition to the card reader and the passive RFID card, the near field communication can also be performed by two transceivers. After one transceiver transmits data, the other transceiver makes a reply in a predefined format. For example, two cell phones can transmit data to each other by means of the NFC technology.

In prior arts, an application is developed by using the NFC technology to enable the wireless communication between a computer and a RFID card or cell phone. The coil antenna used for the near field communication is wound around a display panel. When a user moves the RFID card or cell phone close to the display panel wound with the coil antenna, the RFID card or cell phone can be inductively coupled to a RF module connected to the coil antenna, so as to transmit data to the RF module, which then transmits the data to the computer so as to display the data on the display panel. FIG. 1 and FIG. 2 show a vertical view and a lateral view of an example of this application. When two cell phones 15,16 (or RFID cards) approach a touch sensitive display panel 11, a RF module 13 is inductively coupled to the cell phone 15,16 by an alternating magnetic field (shown as the magnetic power lines) generated by an antenna 12. The user can operate the touch sensitive display panel 11 to instruct a host computer 14 to transmit the data of the cell phone 15 to the cell phone 16. Therefore, after the RF module 13 and the cell phone 15 finish handshaking, the cell phone 15 transmits its data to the host computer 14 via the RF module 13; after the RF module 13 and the cell phone 16 finish handshaking, the host computer 14 sends the data to the cell phone 16 via the RF module 13.

However, in the above application, the antenna 12 is wound around the touch sensitive display panel 11. Thus, when the touch sensitive display panel 11 and the wound antenna 12 become larger, the area of the coil antennas within the cell phones 15,16 (or RFID cards) become smaller in comparison with the area of the antenna 12, and thus the number of the magnetic power lines which can be captured by the cell phones 15,16 is relatively decreased such that the magnetic field intensity is weakened. In order to enable the cell phone 15,16 to capture enough magnetic field intensity required for communication, the RF module 13 and the antenna 12 must supply more power such as increasing the current passing through the antenna 12 or the number of coils of the antenna 12 so as to generate higher magnetic field intensity. However, this would cause the interference between the electronic components in the touch sensitive display panel 11 and the near field communication, and thus the quality degradation of both display and wireless communication. On the other hand, since the area of the antennas in the cell phones 15,16 becomes relatively smaller against the area of the antenna, the coupling coefficient becomes smaller consequently. This would also degrade the communication quality.

Moreover, in the above application, if multiple cell phones or RFID cards are to communicate with each other via the host computer 14 simultaneously, multitasking efficiency is hard to achieve since the host computer 14 can communicate with the cell phones or RFID cards via only one antenna 12.

SUMMARY OF INVENTION

It is therefore one objective of the present invention to provide a NFC system to upgrade near field communication quality.

Another objective of the present invention is to provide a NFC system having multiple antennas, so as to achieve multitasking efficiency unavailable in prior arts.

Another objective of the present invention is to provide an apparatus which can integrate multiple NFC antennas behind a display panel without influencing display quality.

A NFC system provided by the present invention comprises: a display device; a host computer coupled to the display device; at least one radio frequency (RF) module coupled to the host computer; a plurality of antennas disposed behind the display device, wherein the plurality of antennas are coupled to the at least one RF module; and a first NFC device, for communicating with the host computer via a first antenna of the antennas.

An apparatus integrating NFC antennas is provided. The display device, coupled to a host computer, comprises: a display panel; and a plurality of circular antennas disposed behind the display panel, wherein the plurality of circular antennas are coupled to at least one radio frequency (RF) module coupled to the host computer.

DETAILED DESCRIPTION

Figure 1:
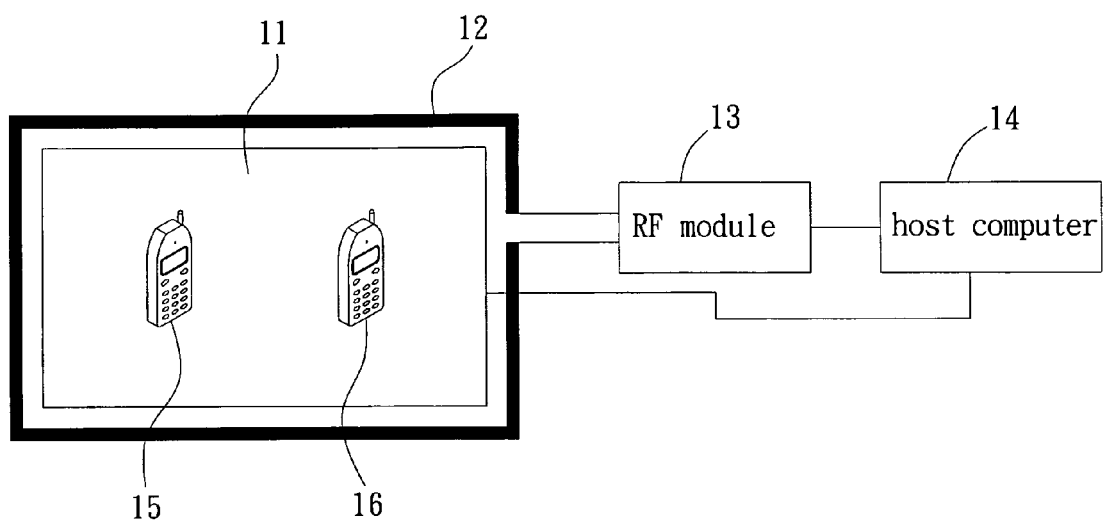
FIG. 1 and FIG. 2 respectively show a vertical view and a lateral view of a practical application of NFC technology.
Figure 2:
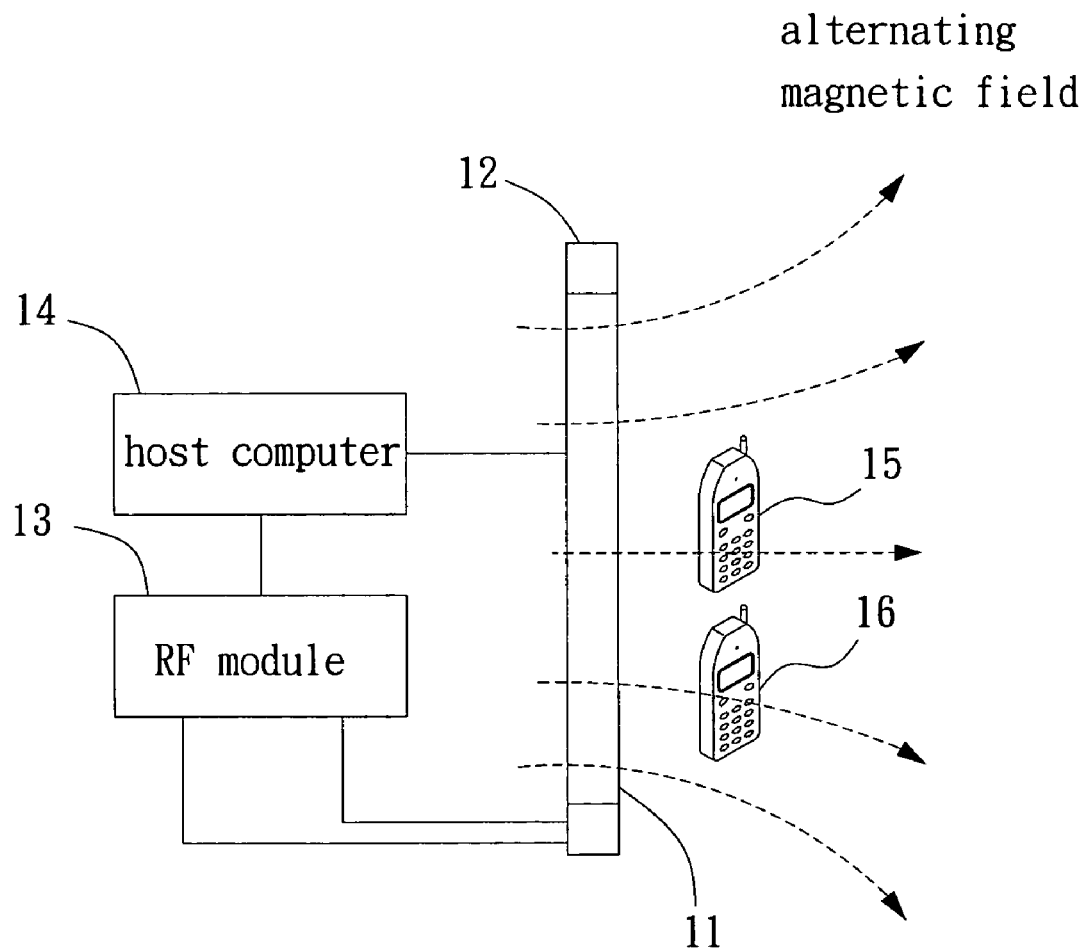
Figure 3:
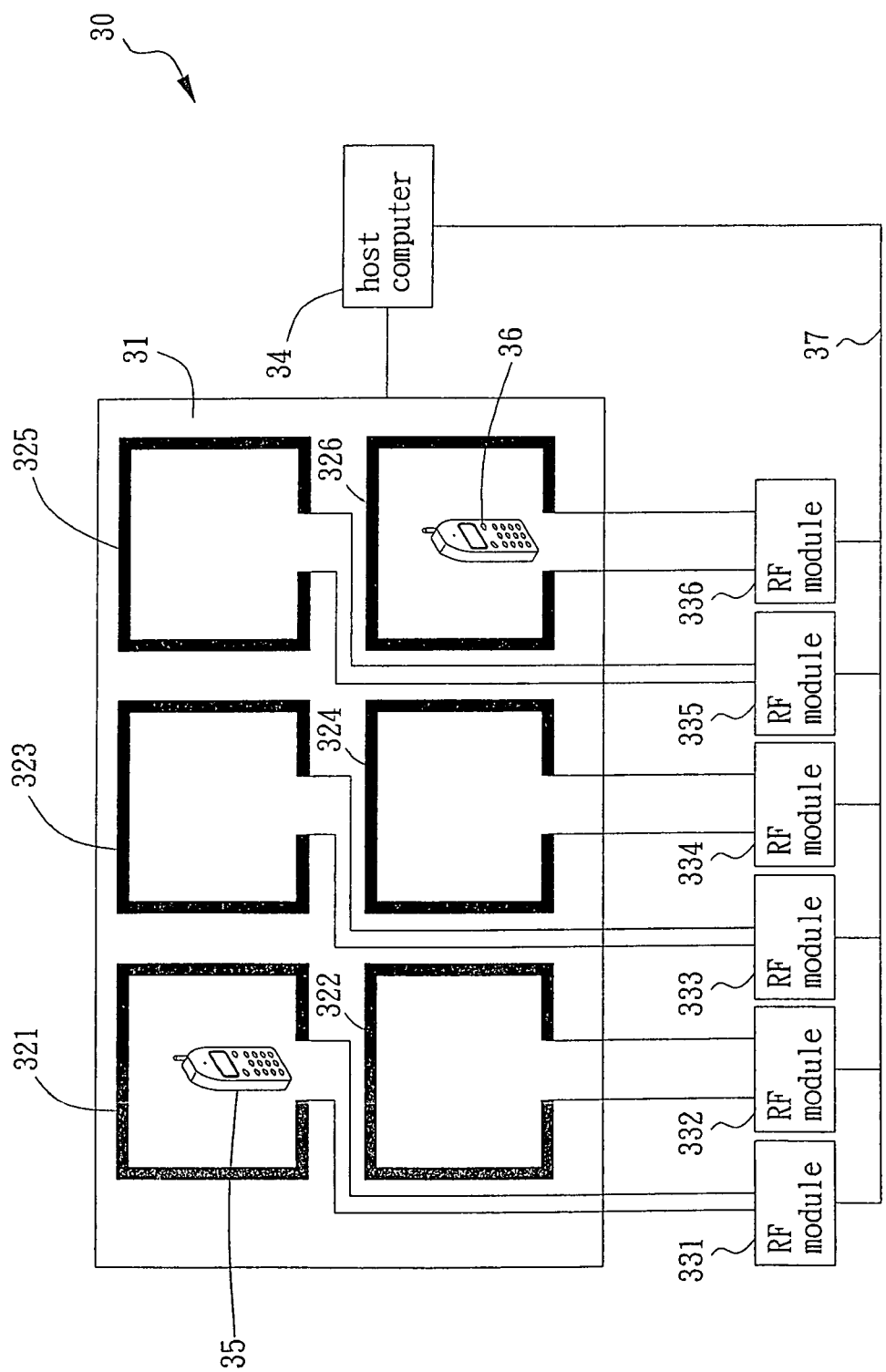
FIG. 3 and FIG. 4 respectively show a vertical view and a lateral view of a NFC system according to an embodiment of the present invention.
Figure 4:
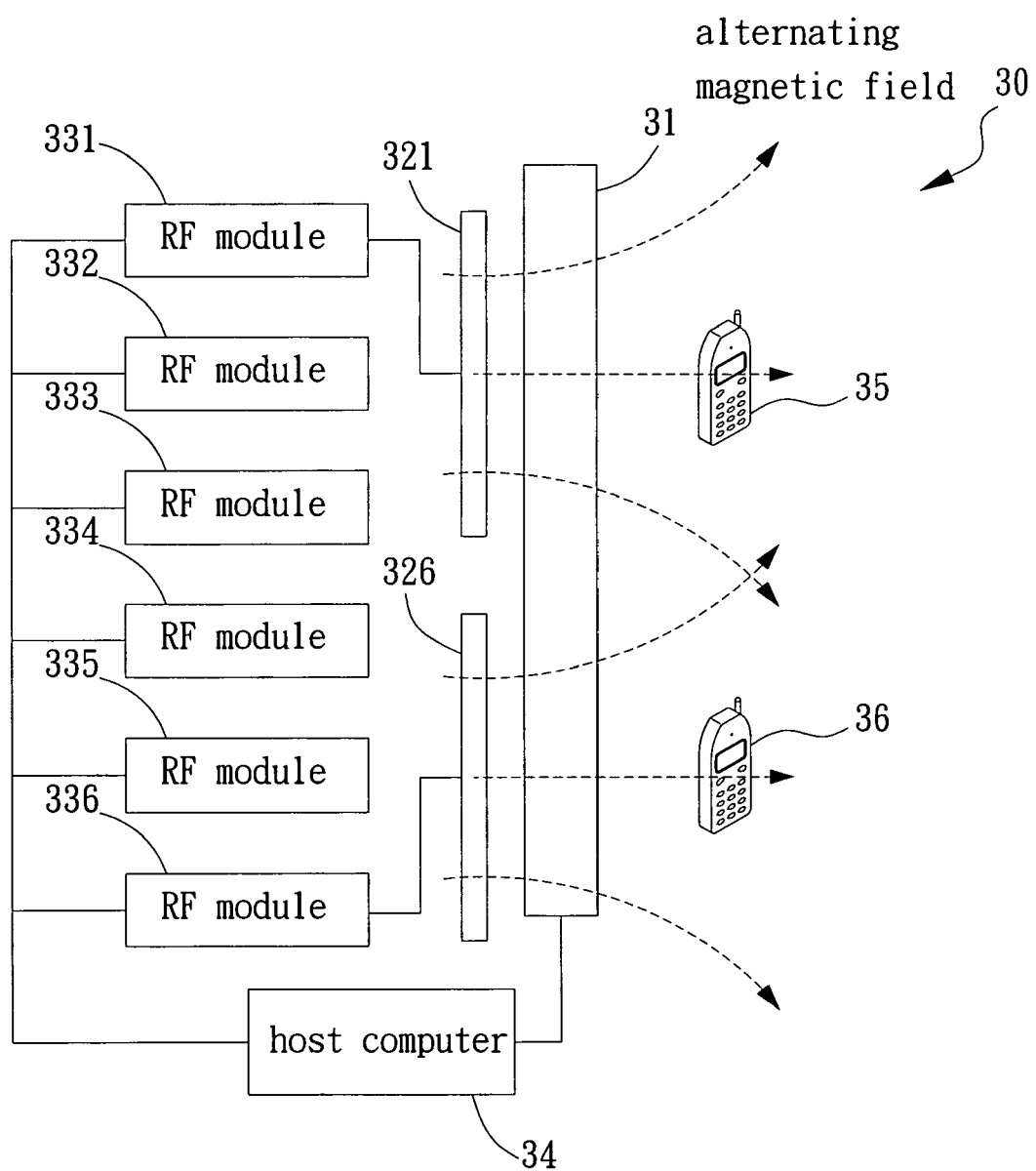

FIG. 3 and FIG. 4 respectively show a vertical view and a lateral view of a NFC system 30 according to an embodiment of the present invention. The NFC system 30 comprises a touch sensitive display 31 (including a display panel), a plurality of circular antennas 321~326, a plurality of RF modules 331~336, a host computer 34, a first NFC device 35 and a second NFC device 36. In FIG. 3 and FIG. 4, the first NFC device 35 and the second NFC device 36 are shown as cell phones, while the first NFC device 35 and the second NFC device 36 can also be other portable electronic devices with NFC capability such as RFID cards, digital cameras, personal digital assistants (PDA), MP3 players, etc. The first NFC device 35 and the second NFC device 36 can be active or passive devices. The active device such as a cell phone has its own power source, while the passive device such as a RFID card does not have. Besides, the number of circular antennas is not limited to six as shown in FIG. 3. The circular antennas 321~326 can be coil antennas. The touch sensitive display 31 of the NFC system 30 is just an embodiment of the present invention, and other types of display panels, such as LCD panel, plasma panel and OLED panel, can also be applied to the NFC system of the present invention.

The circular antennas 321~326 are disposed behind the touch sensitive display 31 (or behind the display panel of the touch sensitive display 31) in an array form. Each of the circular antennas 321~326 is coupled to a corresponding RF module, that is, the circular antenna 321 is coupled to the RF module 331, the circular antenna 322 is coupled to the RF module 332 . . . and the circular antenna 326 is coupled to the RF module 336. The magnetic field range formed by the circular antennas 321~326 covers the touch sensitive display 31, such that the first NFC device 35 and the second NFC device 36 can couple to one of the circular antennas 321~326 when they approach any position on the surface of the touch display panel 31. The RF modules 331~336 and the host computer 34 are all coupled to a bus 37. For example, the RF modules 331~336 can be coupled to a transmission interface (e.g. USB, RS232) of the host computer 34 or a bus connected to the host computer 34 (e.g. I²C, RS485). In one embodiment, each of the RF modules 331~336 has a corresponding identification code for communicating with the host computer 34 and other RF modules. In another embodiment, the number of circular antennas is not equal to that of RF modules. That is, multiple circular antennas may share one RF module, e.g. every three circular antennas share one RF module. Additionally, the RF modules 331~336 can be integrated within the host computer 34.

When the first NFC device 35 approach the surface of the touch sensitive display 31, the first NFC device 35 is inductively coupled to one of the circular antennas 321~326. For example, as shown in FIG. 3, the first NFC device 35 is inductively coupled to the circular antenna 321. Next, the first NFC device 35 transmits a first data stored in itself to the host computer 34 via the circular antenna 321 and the RF module 331 coupled to the circular antenna 321, and then the host computer 34 displays the first data on the touch sensitive display 31. Besides, if the touch sensitive display 31 displays a second data stored in the host computer 34 and a user touches the touch sensitive display 31 to instruct the host computer 34 to transmit the second data to the first NFC device 35, then the host computer 34 transmits the second data to the first NFC device 35 via the RF module 331 and the circular antenna 321. The first data and the second data can be pictures or various kinds of files. In another embodiment, the user can also use a mouse or keyboard (not shown) to instruct the host computer 34 to perform data communication between the first NFC device 35 and the host computer 34.

Figure 5:
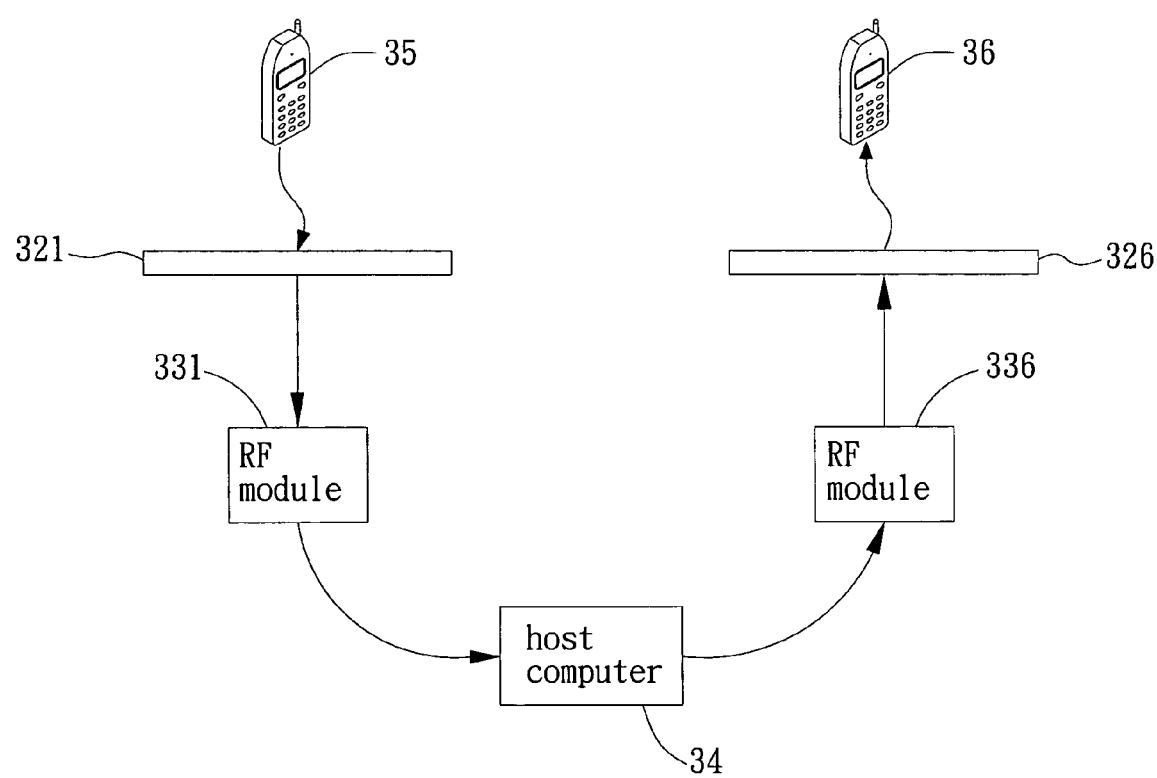
FIG. 5 and FIG. 6 are diagrams respectively showing two different embodiments of the data transmission between the first and second NFC devices of FIG. 3.

As shown in FIG. 3, the second NFC device 36 is inductively coupled to the circular antenna 326. When the user operates the touch sensitive display 31 to instruct the host computer 34 to transmit the first data to the second NFC device 36, the first data stored in the NFC device 35 is transmitted to the second NFC device 36 successively via the circular antenna 321, the RF module 331, the host computer 34, the RF module 336 and the circular antenna 326, as shown in FIG. 5.

Figure 6:
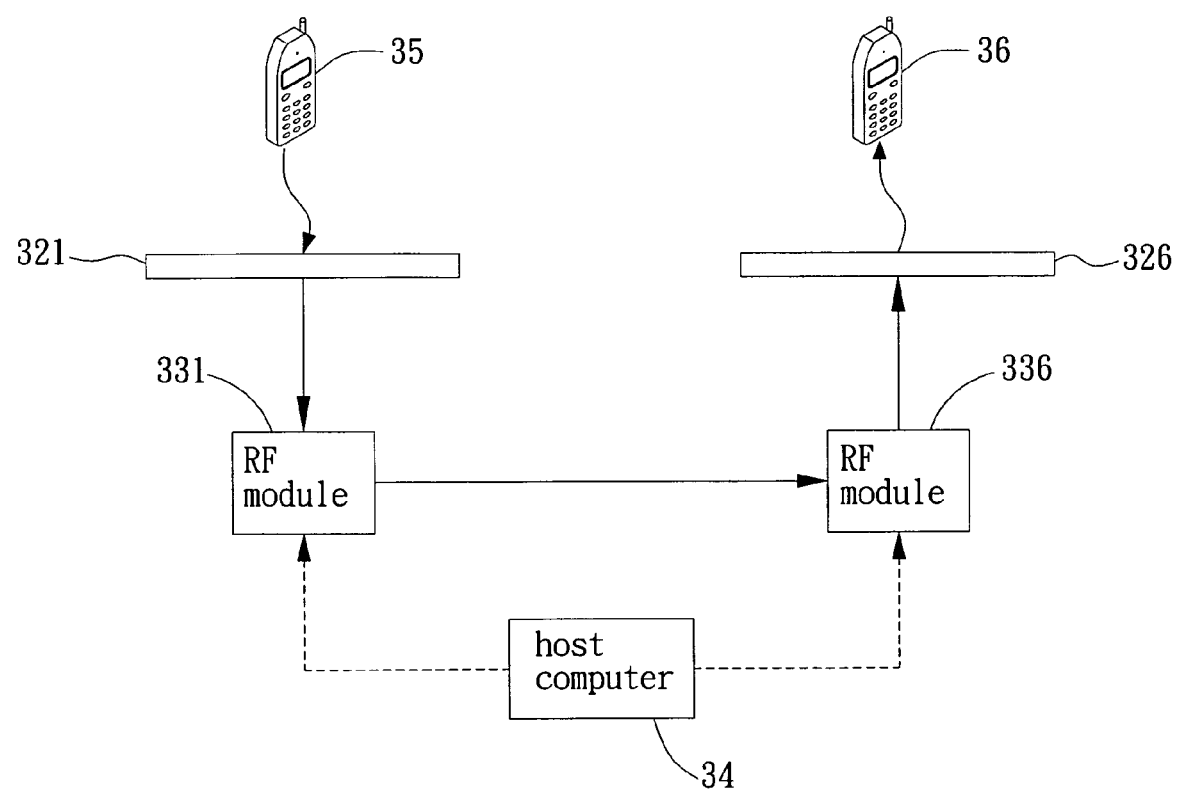

In another embodiment, the RF modules 331~336 are mutually coupled, and therefore the RF modules 331~336 can transmit data with each other. When the user operates the touch sensitive display 31 to instruct the host computer 34 to transmit the first data to the second NFC device 36, the host computer 34 instructs the RF module 331 to directly transmit the first data to the RF module 336 without passing the host computer. Thus, the first data stored in the NFC device 35 is transmitted to the second NFC device 36 successively via the circular antenna 321, the RF module 331, the RF module 336 and the circular antenna 326 as shown in FIG. 6, wherein the solid arrows represent the transmission path of the first data, while the dotted arrows represent the instructions that the host computer 34 issues to the RF modules 331 and 336.

In FIG. 3 and FIG. 4, by means of setting multiple circular antennas behind the display in the array form, the area of each circular antenna can be reduced, so as to increase the coupling coefficient between the circular antenna and the NFC device and thus upgrade communication quality. Furthermore, the circular antenna with a smaller area can avoid the problem of the prior arts that the communication can only be enabled by increasing the current or the number of coils to upgrade the magnetic field intensity. Thus, the circular antenna with a smaller area can also lower the interference between the circular antenna and the display panel. Besides, when more than two NFC devices are to communicate with each other, the NFC system 30 can enable its multiple circular antennas to perform data transceiving simultaneously, so as to achieve multitasking effect and thus upgrade communication efficiency.

While the present invention has been shown and described with reference to the preferred embodiments thereof and in terms of the illustrative drawings, it should not be considered as limited thereby. Various possible modifications and alterations could be conceived of by persons skilled without departing from the scope and the spirit of the present invention.

What is claimed is:

1. A near field communication (NFC) system comprising:
a display device;
a host computer coupled to the display device;
at least one radio frequency (RF) module coupled to the host computer;
a plurality of antennas disposed behind the display device, wherein the plurality of antennas are coil antennas for near field communication and coupled to the at least one RF module;
a first NFC device for communicating with the host computer via a first antenna of the antennas; and
a second NFC device for communicating with the host computer via a second antenna of the antennas;
wherein when a user instructs the host computer to send a first data stored in the first NFC device to the second NFC device, the first data of the first NFC device is transmitted to the second NFC device successively via the first antenna, the RF module coupled to the first antenna, the host computer, the RF module coupled to the second antenna and the second antenna.

2. The NFC system of claim 1, wherein the first NFC device is a portable electronic device with NFC capability.

3. The NFC system of claim 1, wherein the at least one RF module is integrated within the host computer.

4. The NFC system of claim 1, wherein a first data stored in the first NFC device is transmitted to the host computer via the RF module coupled to the first antenna, and the host computer displays the first data on the display device.

5. The NFC system of claim 1, wherein the antennas are disposed behind the display device in an array form.

6. The NFC system of claim 1, wherein the display device is a touch sensitive display device.

7. The NFC system of claim 1, wherein when a user instructs the host computer to send a second data stored in the host computer to the first NFC device, the host computer sends the second data to the first NFC device via the RF module coupled to the first antenna and the first antenna.

8. The NFC system of claim 1, wherein the NFC system comprises RF modules which are mutually coupled.

9. The NFC system of claim 8, wherein the RF modules and the host computer are coupled to a bus.

10. The NFC system of claim 9, wherein each of the RF modules has a corresponding identification code for communicating with the host computer and other RF modules.

11. An apparatus, coupled to a host computer, comprising:
a display panel; and
a plurality of coil antennas disposed behind the display panel, including at least a first antenna and a second antenna, wherein the plurality of coil antennas are coupled to at least one radio frequency (RF) module coupled to the host computer;
wherein, when a first foreign NFC device and a second foreign NFC device approach a surface of the display panel, the first foreign NFC device is capable of communicating with the host computer via the first antenna, and the second foreign NFC device is capable of communicating with the host computer via the second antenna.

12. The apparatus of claim 11, wherein the first foreign NFC device and the second foreign NFC device are both is a portable electronic devices with NFC capability.

13. The apparatus of claim 11, wherein the at least one RF module is integrated within the host computer.

14. The apparatus of claim 11, wherein the coil antennas are disposed behind the display panel in an array form.

15. The apparatus of claim 11, wherein when a user instructs the host computer to send a first data stored in the first foreign NFC device to the second foreign NFC device, the first data of the first foreign NFC device is transmitted to the second foreign NFC device successively via the first antenna, the RF module coupled to the first antenna, the host computer, the RF module coupled to the second antenna and the second antenna.

* * * * *